United States Patent [19]

Kresge et al.

[11] Patent Number: 4,803,035
[45] Date of Patent: Feb. 7, 1989

[54] METHOD FOR MAKING COMPOSITE FILMS

[75] Inventors: Edward N. Kresge, Watchung; Donald R. Hazelton, Chatham Township, both of N.J.

[73] Assignee: Exxon Chemical Patents Inc., Linden, N.J.

[21] Appl. No.: 809,511

[22] Filed: Dec. 16, 1985

[51] Int. Cl.$^4$ ............................................. B29C 47/78
[52] U.S. Cl. ..................................... 264/519; 264/514; 264/142; 264/143; 264/171; 264/210.5; 264/327; 425/67
[58] Field of Search ...................... 264/519, 327, 210.5, 264/514, 130, 171, 300, 141, 142, 143; 425/67; 525/240, 210

[56] References Cited

U.S. PATENT DOCUMENTS

| | | | |
|---|---|---|---|
| 2,795,821 | 6/1957 | Williams | 264/211 |
| 3,949,039 | 4/1976 | Yamamoto et al. | 264/142 |
| 4,053,548 | 10/1977 | Lundberg et al. | 264/296 |
| 4,136,149 | 1/1979 | Payne | 264/300 |
| 4,183,887 | 1/1980 | Karg | 264/130 |
| 4,309,465 | 1/1982 | Kornbaum | 264/176.1 |
| 4,323,534 | 4/1982 | DesMarais | 264/300 |
| 4,410,482 | 10/1983 | Subramanian | 264/515 |
| 4,532,100 | 7/1985 | Lancaster et al. | 264/143 |
| 4,622,193 | 11/1986 | Kresge et al. | 264/142 |
| 4,664,866 | 5/1987 | van der Heijden | 264/519 |

FOREIGN PATENT DOCUMENTS 56-67209  6/1981  Japan ................... 264/300

Primary Examiner—Jeffery Thurlow

[57] ABSTRACT

A process for preparing composite films comprising at least one layer of a first plastic polymer and a substrate of a second polymer/first plastic polymer composition by intimately mixing about 15 to about 90 wt. % of first plastic polymer and about 10 to 85 wt. % of the second polymer, extruding the mixture through a film die while cooling at least one surface of the die outlet at least about 10° C. below the melting point of the plastic polymer and cooling the film. In a preferred embodiment the first plastic polymer has a semi-crystalline or crystalline melting point which is at least 10° C. above the softening or melting point of the second polymer.

A sandwich type laminate comprising two outer skins of first plastic polymer enclosing a core comprising a blend of first plastic polymer and second polymer can be prepared by cooling both die outlet surfaces. Where a blown film die is utilized the inner and outer die layers must be cooled to accomplish this end. In a sheet die both the upper and lower die layers are cooled.

13 Claims, No Drawings

METHOD FOR MAKING COMPOSITE FILMS

BACKGROUND OF THE INVENTION

Many elastomers are tacky or exhibit cold flow in their green or uncured state. As a consequence, these materials cannot be transported in bulk as free flowing pellets but must be shipped in bales. This practice requires that the ultimate elastomer processor must be equipped to cut up or mill the bales. The necessary equipment is generally large scale, expensive equipment. Additionally, the bales cannot be readily preblended with other materials. The necessity for baling results in high handling and shipping costs. In order to facilitate handling and processing of elastomers, it has been considered desirable to produce elastomer pellets. Generally, however, elastomer pellets exhibit "blocking" or cold flow characteristics which result in solidification into a solid mass after a short storage time, especially at warm temperatures.

Numerous attempts have been made to formulate elastomeric pellets which will remain free flowing until they are to be processed. Dusting the elastomeric pellets with inorganic materials, e.g., clay, talc, etc., has been found to extend the time over which the pellets are free flowing. Improved results have been achieved by dusting a coating with selected organic materials such as hydrocarbon waxes (British Patent 901,664) or powdered polyethylenes and polypropylenes (British Patent 928,120). However, because of the discontinuity of the dust coat, the coated pellets eventually flow together to form a solid mass.

By blending the elastomer with a crystalline type polymer such as polyethylene, polypropylene or copolymers of ethylene and propylene, it has been possible to produce free flowing elastomer containing pellets. However, the elastomer content of the pellet must be less than about 65%. The product is, of course, not suitable for use in all elastomer applications.

Another coating approach to the problem has been the coating of elastomer pellets with emulsions containing a tack free coating material. Coating is accomplished either by dipping pellets into the emulsion or spraying the emulsion onto the pellets. In either case the emulsion coating must be dried, and where the emulsion contains a solvent the solvent must be recovered. Drying and solvent recovery requirements result in increased costs.

Melt-coating methods for producing free-flowing elastomer pellets have also been suggested. According to U.S. Pat. No. 3,669,772 to Bishop, coating can be accomplished by using a die, similar to wire coating die, into which a strand of rubber to be coated is fed simultaneous with melt coating material. A continuous melt coated strand of rubber issues from the coextrusion die outlet, is cooled in a liquid cooling bath, and is subsequently pelletized. This melt-coating method not only adds significantly to rubber manufacturing costs, but has limitations from the standpoint of efficiently producing large quantities of coated pellets.

Pellets of rubber have been coated with various coating materials by heating the rubber pellet to a temperature which is higher than the melting point of the coating material, and then contacting the heated pellet with the coating material which is preferably in the form of a fine powder. The heated pellet fluxes the coating material on the surface of the pellet to form a substantially continuous coating. The hot coated pellet is then cooled.

A study of bicomponent mixtures has shown that upon extrusion of the mixtures, stratification will occur. See Soulborn, J. H. and Ballman, R. L.; "Stratified Bicomponent Flow of Polymer Melts in a Tube", Applied Polymer Science, No.20, 175-189 (1973). The authors attribute stratification to differences in the melt viscosity of the components.

SUMMARY OF THE INVENTION

It has surprisingly been found that a composite film comprising at least one layer of a first plastic polymer and a substrate of a second polymer/first plastic polymer composition can be prepared by intimately mixing about 15 to about 90 wt. % of first plastic polymer and about 10 to about 85 wt. % of the second polymer, extruding the mixture through a film die while cooling at least one surface of the die outlet at least about 10° C. below the melting point of the plastic polymer and cooling the film. In a preferred embodiment the first plastic polymer has a semicrystalline or crystalline melting point which is at least 10° C. above the softening or melting point of the second polymer.

A sandwich type laminate comprising two outer skins of first plastic polymer enclosing a core comprising a blend of first plastic polymer and second polymer can be prepared by cooling both die outlet surfaces. Where a blown film die is utilized the inner and outer die layers must be cooled to accomplish this end. In a sheet die both the upper and lower die layers are cooled.

DETAILED DESCRIPTION

This invention relates to a method for preparing composite films. More particularly, it relates to a method for preparing composite films of a first plastic polymer and a substrate of a second polymer/ first plastic polymer substrate in a single step extrusion process. The process of this invention may advantageously be utilized to produce sandwich type composite film laminates comprising a core which comprises a blend of the first plastic polymer and second polymer having outer skins comprising the first plastic polymer.

By way of illustration the process of this invention is described in terms of preparing a pellet comprising a blend of first plastic polymer and second polymer coated with a skin of first plastic polymer. By reference to this disclosure, however, its applicability to the preparation of composition films will be readily apparent to those skilled in the art.

In the practice of this invention an elastomer is blended with a semi crystalline or crystalline plastic material which has a melting point of at least 10° C. higher than the softening point of the elastomer, preferably at least about 15° C. than the softening point of the elastomer, preferably at least 30° C., more preferably at least 40° C. The elastomer/plastic blend is then extruded through a die in which the die outlet is maintained at least 10° C. below the melting point of the plastic in order to develop a temperature gradient across the die from die inlet to die outlet, preferably at least 20° C., more preferably at least about 30° C. below the melting point of the plastic.

Not wishing to be bound by theory, it is believed that as the melt temperature is reduced across the die, the difference in viscosity between the elastomer and the plastic is increased thereby causing stratification in a manner so as to cause the plastic to be concentrated along the surface of the die orifice while the central core becomes elastomer rich. Shear plays an important part in the stratification process as does the wall effect because of their effect on the velocity profile of the two components of the melt, and hence, the composition differences throughout the melt exiting the die. The melting point of the polymer is a function of shear and pressure, and is higher in the dynamic system of an extruder die than the static melting point of the polymer. As used in the specification and claims, "melting point" will mean the normal static melting point or softening point of the polymer.

The elastomer/plastic polymer composition is extruded through a multi-orificed strand die in the aforedescribed manner and pelletized either by use of a strand pelletizer or by using a die face pelletizer. In one embodiment a conventional strand die is modified by having the die outlet plate cored so that it can be water cooled. In a preferred embodiment the die cooling is accomplished by using an underwater pelletizer. Typical of these underwater pelletizers is the mini underwater pelletizer (MUP) manufactured by Gala Industries, Inc., Eagle Rock, VA.

Since the stratification process by which a pellet coated with a skin of plastic is formed requires a finite time the L/D ratio of the die outlet holes is an important criterion in carrying out the process of this invention. The L/D ratio can be about 2 to about 20, preferably about 2.5 to about 12, more preferably about 3 to about 10, e.g., about 3.5 to about 8. The die outlets through which strands of elastomer/plastic blends are extruded can be converging tubular outlets which have a larger diameter inlet than outlet. In that event, the L/D ratio is based on an average outlet diameter over the length of the channel.

The length of the outlet channel can be about 1 inch to about 4 inches, preferably about 1.5 to about 3.5 inches, more preferably about 2.0 to about 3.0 inches, e.g., about 2.5 inches. The diameter of the die outlet orifice can be about 0.05 to about 0.200 inches, preferably about 0.075 to about 0.150 inches, e.g., about 0.125 inches.

A critical parameter in carrying out the process of this invention is the temperature gradient across the die from the inlet to the outlet. While no particular temperature gradient is required, at some point within the die the melt temperature must be reduced to a temperature which is preferably at about the melting point of the plastic in order to insure that there is a significant difference between he viscosity of the plastic melt and the viscosity of the elastomer melt. It is not essential that the melt temperature of the composition be below that of the plastic melt point. In a preferred embodiment, however, the melt temperature of the composition is reduced to a temperature which is below the melting point of the plastic component. In the preferred method of carrying out the process of this invention, an underwater pelletizer is used and the temperature gradient across the die is created by cooling the face of the die.

The maximum temperature differential across the die is achieved by operating at or about the plugging temperature of the system. The "plugging temperature" is that temperature at which some of the die outlet orifices begin to be plugged by solidified polymer. Some plugging of a multi-orifice die can be tolerated up to the point where flow rate is decreased below economical rates. Generally, the outer outlet holes in the die will plug first. A multi-orifice die will have twenty or more outlet holes, e.g., 50–100. It is possible to operate the die at the plugging temperature with as much as about 20–30% of the holes plugged.

The plugging temperature is determined by gradually cooling the die or die face to the point where outlet hole plugging begins to occur. Operation at the plugging temperature achieves the maximum stratification and plastic skin development in the elastomer pellet.

Where an underwater pelletizer is used, the cooling water temperature will be about 20° C. to about 50° C. The "extruder melt temperature" (the die inlet melt temperature) will be about 160° C. to about 250° C. and will depend on the elastomer and plastic selected. The appropriate extruder melt temperature for various plastic/elastomer compositions is known to those skilled in the extrusion art.

The process of this invention is particularly suited to those elastomers which are tacky in their solid state or exhibit cold flow. Illustrative, non-limiting examples of the elastomers to which this invention may be applied are high molecular weight elastomers having a Tg of less than 0° C., e.g. ethylene-propylene rubber (EPR), terpolymers of ethylene, propylene and a non-conjugated diene (EPDM), natural rubber, polyisobutylene, butyl rubber, halogenated butyl rubber, acrylonitrile-butadiene rubber (NBR) and styrene butadiene rubber (SBR).

The plastics which may be utilized in the practice of this invention have a crystalline melting point of at least 70° C. Illustrative of those plastic polymers are high density polyethylene (HDPE), low density polyethylene (LDPE), polypropylene (PP), LLDPE, syndiotactic polybutadiene resin (SBD), polybutene-1 and crystalline copolymers of ethylene and other alphaolefins. The plastic and elastomer must be insoluble in one another in the melt state.

The elastomer-plastic polymer composition of this invention can comprise about 15 to about 90 weight percent plastic polymer, e.g., about 20 to about 80 weight percent. Where the product desired is an elastomeric product the plastic polymer comprises about 15 to about 35 weight percent of the composition; preferably about 15 to about 30 weight percent, most preferably about 20 to about 28 weight percent, e.g., about 25 wt. %.

The plastic and polymer may be blended in any conventional manner and fed to an extruder. For example, an elastomer bale can be shredded and blended with plastic polymer powder in a ribbon blender and subsequently fed to an extruder. Preferably a mixing extruder, e.g., twin screw extruder is used for the extrusion to insure complete mixing of the elastomer and plastic. The mixture is extruded out of a conventional multi-orificed die in which die face is maintained at a temperature of at least about 10° C. below the melting point of the plastic polymer. Preferably the die face is maintained at a temperature at least about 10° C. below the melting point of the plastic polymer; more preferably at least about 20° C.; most preferably at least about 30° C. below the melting point of the plastic. Of course, in view of the high melt temperature of the polymers the entire die plate cannot be maintained at a single temperature, and there will be a temperature gradient across the die from its internal inlet surface to its outer face at the outlet of the die.

To demonstrate the effectiveness of the instant invention, an elastomer-plastic polymer composition having the formulation shown in Table I was extruded through a conventional multi-orificed strand die and cooled by passing the polymer strands through a water bath. Subsequently, the strands were pelletized. Additionally the same formulation was pelletized using an underwater pelletizer.

The underwater cut pellets had a plastic skin, a lower coefficient of friction and were more free flowing than the conventional strand pelletized material. Table II compares the coefficient of friction of the two products, and Table III shows the pressure/strength ratio for the compositions. The pressure/strength ratio is the ratio of the consolidation pressure to yield strength under the shear required to create pellet flow. A higher ratio is indicative of a more free flowing pellet.

TABLE 1

| Elastomer/Plastic Composition |
| --- |
| Elastomer[1]: 40% by weight |
| Plastic Polymers |
| HDPE[2] 16% by weight |
| Polypropylene[3] 44% by weight |

[1]An ethylene propylene copolymer containing 43% ethylene, having a glass transition temperature of 55° C., and having a mooney viscosity of 25 (1 + 8 at 127° C.).
[2]AB 55-100; a 10 melt index HDPE polymer.
[3]An isotactic polypropylene reactor copolymer of propylene and ethylene having a crystalline melt temperature of 160° C.

TABLE II

| | | Wall Friction Angle (Degrees) | |
| --- | --- | --- | --- |
| | Process | Stainless Steel | Aged Carbon Steel |
| A | Conventional strand cut | 22 | 22 |
| B | Underwater cut (skin) | 13 | 18 |

TABLE III

| Process | Consolidating Pressure (psi) | Yield Strength (psf) | Pressure/ Strength ratio |
| --- | --- | --- | --- |
| A | 386 | 135 | 2.49 |
| B | 272 | 18 | 15.1 |

In preparing the underwater die cut pellets of this invention, the MUP was operated with an extruder melt temperature of 408° F., an extruder pressure of 1600 psi and cooling water temperature of 105° F. The extruder output rate was 125 lbs/hr.

It is evident from the above data that pellets made according to the process of this invention are more free flowing than strand pelletized material even where the compositions are identical. The rubber phase of the composition was extracted with hexane. The product produced according to the process of this invention has a skin which is substantially all plastic polymer while the pelletized strands are essentially of uniform composition throughout.

In order to demonstrate that the skin of the pellets of this invention are substantially all plastic polymer, the pellets were treated with hexane to extract the rubber phase. Rubber was extracted from the surface of the conventional strand pelletized material, whereas substantially no rubber was extracted from the skin of the pellets prepared according to the process of this invention.

While the invention has been described in terms of a process for manufacturing an elastomer coated pellet having a plastic polymer skin, it will be evident from the foregoing disclosure that the process can be utilized to prepare polymer film comprising a laminate of one polymeric material over another. Alternatively, it may be utilized to prepare a sandwich of one polymer material on each face of a second polymer material.

The criteria for the manufacture of such films is that a first polymer must be insoluble in a second polymer in the melt state, and that the polymers have softening or melt points which are separated from one another by at least 10° C.; preferably at least about 30° C.; more preferably at least about 40° C. The polymer, which is intended to produce the "skin" of the composite, must have the higher melting point.

With respect to the description of the invention relating to free flowing pellets, the core of the pellet is generally an elastomer. The second polymer of the film composition need not be an elastomer so long as the foregoing criteria are met.

The film may be produced using conventional film forming techniques, e.g., blown, cast or tubular water bath methods. However, in order to form the "skin" on at least one surface of the composite, a die surface must be cooled in the aforedescribed manner.

A conventional method of preparing blown film utilizing an "A" frame and nip roll provides for cooling of the extruded, blown film using an annular water bath which surrounds the film bubble and cools it. This technique can be modified by cooling the inner die outlet lip either by water cooling the face or by using a water cooled mandrel in extruding the blown film and cooling the mandrel.

Similarly a slit die may be used to prepare coated film. If only the upper or lower die outlet lip is cooled a film comprising two layers, the plastic layer and an elastomer or second plastic layer is formed. Where both die lips are cooled, a sandwich is prepared with outer skins of plastic polymer and an inner core of elastomer or second plastic polymer.

In another embodiment of the invention, a second plastic polymer may be compounded with chemical blowing agents. Alternatively, a pneumatogen e.g., Freon, may be injected into the extruder melt. The resulting product has a foamed core between two plastic polymer skins.

In another embodiment an elastomer is blended with tackifier resins, e.g., terpene resins to form a pressure sensitive or melt adhesive. Only one die outlet lip is cooled. The resulting product is an adhesive coated film of plastic polymer useful as wall or shelf coverings.

Where the elastomer/plastic polymer composition has the formulation shown in Table I a sandwich can be prepared having a heat sealable plastic skin and a flexible elastomer core. The product is useful for flexible packaging operations, e.g., medical solution bags.

In addition to the plastics described above, other polymers, e.g., thermoplastic polyesters, ionically crosslinked polymers, PVC, etc. can be utilized to prepare the coated films of this invention. The ionically crosslinked polymers included sulfonated EPDM and carboxylic acid polymers of ethylene or carboxylic acid copolymers of styrene.

We claim:

1. A process for preparing a composite film comprising at least one layer of a first plastic polymer and a substrate of a second polymer/first plastic polymer composition wherein the plastic polymer has a semicrystalline or crystalline melting point which is at least 10° C. higher than the second polymer softening or melting point, said first plastic polymer comprising about 15 to about 90 weight percent of the second polymer/first plastic polymer composition said second polymer and plastic polymer being insoluble in one another, which comprises:

(a) intimately mixing the second polymer and first plastic polymer;

(b) extruding the mixture through a film die having a die outlet comprising a first die surface and a second die surface;

(c) cooling at least one surface of the die outlet to a temperature at least about 10° C. below the melting point of the plastic polymer; and (d) cooling the film so formed.

2. The process according to claim 1 wherein the first plastic polymer comprises about 15 to about 60 weight percent of the second polymer/first plastic polymer mixture.

3. The process according to claim 2 wherein the first plastic polymer comprises about 15 to about 35 weight percent of the second polymer/first plastic polymer composition.

4. The process according to claim 1 wherein the second polymer is an elastomeric polymer having a Tg of less than 0° C.

5. The process according to claim 4 wherein the elastomer is EPR, EPDM, NR, SBR, PIB, or halobutyl rubber, or mixtures thereof.

6. The process according to claim 4 wherein the plastic polymer is HDPE, LDPE, LLDPE, polypropylene, polybutene-1, a crystalline copolymer of ethylene and an alphaolefin or mixtures thereof.

7. The process according to claim 4 wherein the elastomer is EPR or EPDM and the plastic polymer is a crystalline ethylenepropylene copolymer, HDPE or mixtures thereof.

8. The process according to claim 4 wherein the plastic polymer is sulfonated EPDM ionomer or poly(ethylene glycol terphalate).

9. The process according to claim 4 wherein the elastomer is combined with tackifier resins thereby forming an elastomeric pressure sensitive adhesive composition.

10. The process according to claim 9 wherein the die is a blown film die having an annular outlet bounded by an inner and outer die lip, only said inner die lip being cooled.

11. The process according to claim 4 wherein the elastomer is an ethylene propylene copolymer and the plastic polymer is a blend of an HDPE and a crystalline copolymer of ethylene and propylene.

12. The process according to claim 11 wherein the elastomer/plastic composition comprises about 40 weight percent elastomer based on the elastomer/plastic composition, the HDPE comprises about 16 weight percent of the elastomer/plastic composition and the crystalline ethylene propylene copolymer comprises about 44 weight percent of the elastomer/plastic composition.

13. The process according to claim 1 wherein both the first and second die surface are cooled.

* * * * *